United States Patent [19]
St. John et al.

[11] Patent Number: 5,892,464
[45] Date of Patent: Apr. 6, 1999

[54] MESSAGE ENCODING TECHNIQUE FOR COMMUNICATION SYSTEMS

[75] Inventors: James T. St. John; William O. Janky, both of Goode, Va.

[73] Assignee: Ericsson Inc., Research Triangle Park, N.C.

[21] Appl. No.: 820,617

[22] Filed: Mar. 19, 1997

[51] Int. Cl.⁶ .................................................. G06F 11/10
[52] U.S. Cl. ............................................................. 371/43.1
[58] Field of Search ............................. 371/37.1, 43.1, 371/43.2, 43.3, 43.4, 46, 35; 455/39; 375/225, 262

[56] References Cited

U.S. PATENT DOCUMENTS

| | | | |
|---|---|---|---|
| 5,287,374 | 2/1994 | Parr | 371/43 |
| 5,319,649 | 6/1994 | Raghavan | 371/37.1 |
| 5,384,782 | 1/1995 | Elms | 371/2.1 |
| 5,442,646 | 8/1995 | Chadwick et al. | 371/43 |
| 5,453,997 | 9/1995 | Roney, IV | 371/41 |
| 5,499,246 | 3/1996 | Cooper | 370/95.1 |
| 5,625,872 | 4/1997 | Sawyer | 455/33.1 |
| 5,691,992 | 11/1997 | Molnar et al. | 371/37.1 |
| 5,729,557 | 3/1998 | Gardner et al. | 371/41 |
| 5,740,283 | 4/1998 | Meeker | 382/248 |
| 5,757,854 | 5/1998 | Hunsinger et al. | 375/260 |
| 5,805,585 | 9/1998 | Javitt et al. | 370/342 |

*Primary Examiner*—Albert DeCady
*Attorney, Agent, or Firm*—David K. Purks

[57] ABSTRACT

A process and apparatus are disclosed for encoding input signals for transmission by a transmitter. A pattern of binary values is generated which has a predetermined average binary weight. The input signals are modulated with the predetermined pattern of binary values. The modulated signals are encoded with a forward error correction code which provides a predetermined level of coding protection. The average binary weight of the predetermined pattern of binary values is selected to be at least as great as the level of coding protection provided by the forward error correction code.

16 Claims, 4 Drawing Sheets

MESSAGE ENCODING TECHNIQUE FOR COMMUNICATION SYSTEMS

FIELD OF THE INVENTION

The present invention relates to encoding information for transmission to a receiver, and more particularly, to a method and apparatus for adjusting the binary weight of the information before the information is encoded with a forward error correction code and transmitted to the receiver.

BACKGROUND OF THE INVENTION

Wireless communication systems generally include control terminals (e.g. base stations or satellites) and mobile terminals (e.g. phones or radios). The information which is communicated between control terminals and mobile terminals includes not only user messages, such as speech or data, but also control messages which enable the control terminals to monitor and control the mobile terminals. In some communication systems, control messages can be communicated on the same radio frequency (RF) channel as user messages. In the digital cellular radio system standard known as Global System for Mobile Communication (GSM) and the land mobile radio standard known as Enhanced Digital Access Communication System (EDACS), developed by Ericsson, control messages can be transmitted as so-called Fast Associated Control Channel (FACCH) messages. FACCH messages generally carry urgent control information such as a handoff command where the control terminal instructs the mobile terminal to switch to another frequency or timeslot. The FACCH messages are assigned a higher priority than user messages so that they are transmitted across a channel before any awaiting user messages.

Since FACCH messages are transmitted on the same channel as user messages, a receiver must be able to reliably distinguish between FACCH and user messages. The different message types can be distinguished through flag bits which are transmitted with each message and serve to indicate the message type. However, flag bits increase the length of the transmitted messages and can become corrupted, thereby causing misidentification of associated messages.

An alternative approach to distinguishing FACCH and user messages is to transmit FACCH messages using one convolution rate and user messages using another different convolution rate. Consequently, the convolution rate of the transmitted message is indicative of whether the message is a FACCH message or a user message. A receiver determines which convolution rate was used to encode the transmitted message by decoding a received message using both convolution rates and comparing the resulting bit error rates (BERs) of both decoded messages. The decoding convolution rate which provides the lowest bit error rate corresponds to the encoding convolution rate of the transmitted message. Whether the message is a FACCH message or a user message is determined from the identified convolution rate of the transmitted message.

In practice, in noisy conditions where many of the binary values of a message can become reversed and where FACCH messages can have a relatively low number of logical "ones", there is a risk of a receiver erroneously identifying a FACCH message as a user message. Misidentification of a FACCH message results in the receiver failing to extract and use the FACCH information and, consequently, results in degraded performance of the communication system.

SUMMARY OF THE INVENTION

The present invention is directed to a method and apparatus for encoding message signals for transmission by a transmitter. A predetermined pattern of binary values is generated which has a predetermined average binary weight. The message signals are modulated with the predetermined pattern of binary values, causing the binary weight of the message signals to be increased. The modulated signals are encoded with a forward error correction (FEC) code which provides a predetermined level of coding protection. The average binary weight of the predetermined pattern of binary values is selected to be at least as great as the level of coding protection which is provided by the forward error correction code. In this manner, the encoded message signals are caused to have a binary weight which is at least as great as the level of coding protection which is provided by the FEC code.

In a further embodiment of the present invention, the method and apparatus for encoding message signals is utilized in a transmitter to encode FACCH messages for transmission to a receiver. The FACCH messages are transmitted on the same RF channel as user messages. The FACCH messages are encoded with different FEC codes than the user messages to permit the receiver to distinguish between the two types of messages. The receiver identifies the FEC code of the transmitted message by decoding a received message using the inverse of FEC code associated with user messages and examining the magnitude of the resulting BER. A low BER rate indicates that the received message is a user message while a high BER rate is indicative of a control message. Importantly, the binary weight of control messages is sufficiently increased by their modulation with the predetermined pattern of binary values to avoid the FEC codes associated with the user message from causing a low binary weight control message from being misidentified as a user message.

BRIEF DESCRIPTION OF THE DRAWINGS

For a more complete understanding of the present invention and the further advantages thereof, reference is now made to the following Detailed Description, taken in conjunction with the Drawings, in which.

DETAILED DESCRIPTION OF THE INVENTION

It will be appreciated to one skilled in the art that the present invention can be used in land-based communication systems as well as satellite communication systems or in systems which support both land-based and satellite modes of operation.

Figure 1:
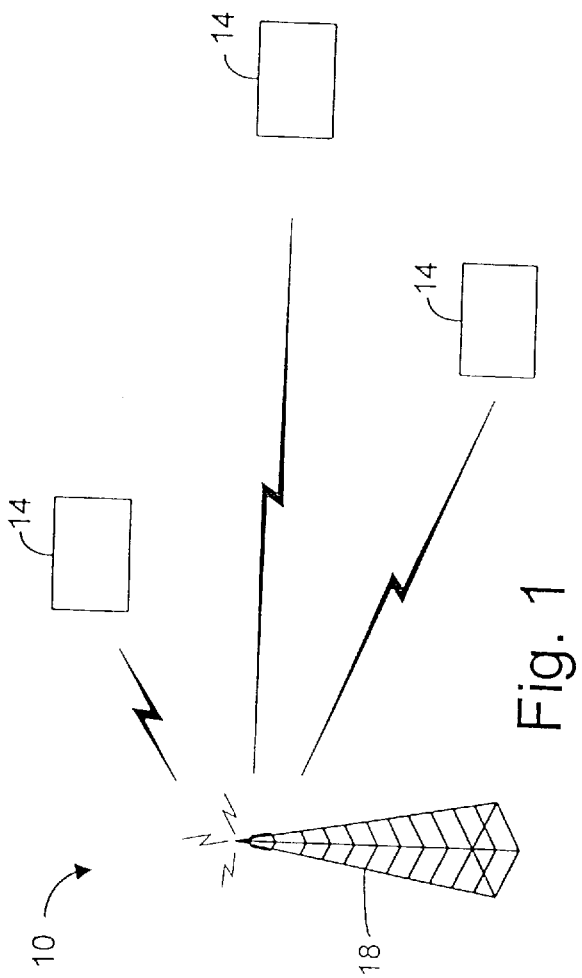
FIG. 1 illustrates a land-based communication system in which the present invention can be used.

With reference to FIG. 1, a land-based radio system 10 includes a plurality of radios 14 and a base station 18. Users of the radios 14 communicate with each other by relaying user messages, such as voice from a microphone or data from a computer, through the base station 18. The base station 18 controls the radios 14 through the use of control messages which can contain information such as frequency and time slot assignments. Urgent control messages (i.e. messages which must be communicated with a low time latency, such as FACCH messages) are transmitted on the same RF channel as is used to carry user messages between the base station 18 and a desired one of the radios 14.

Figure 2:
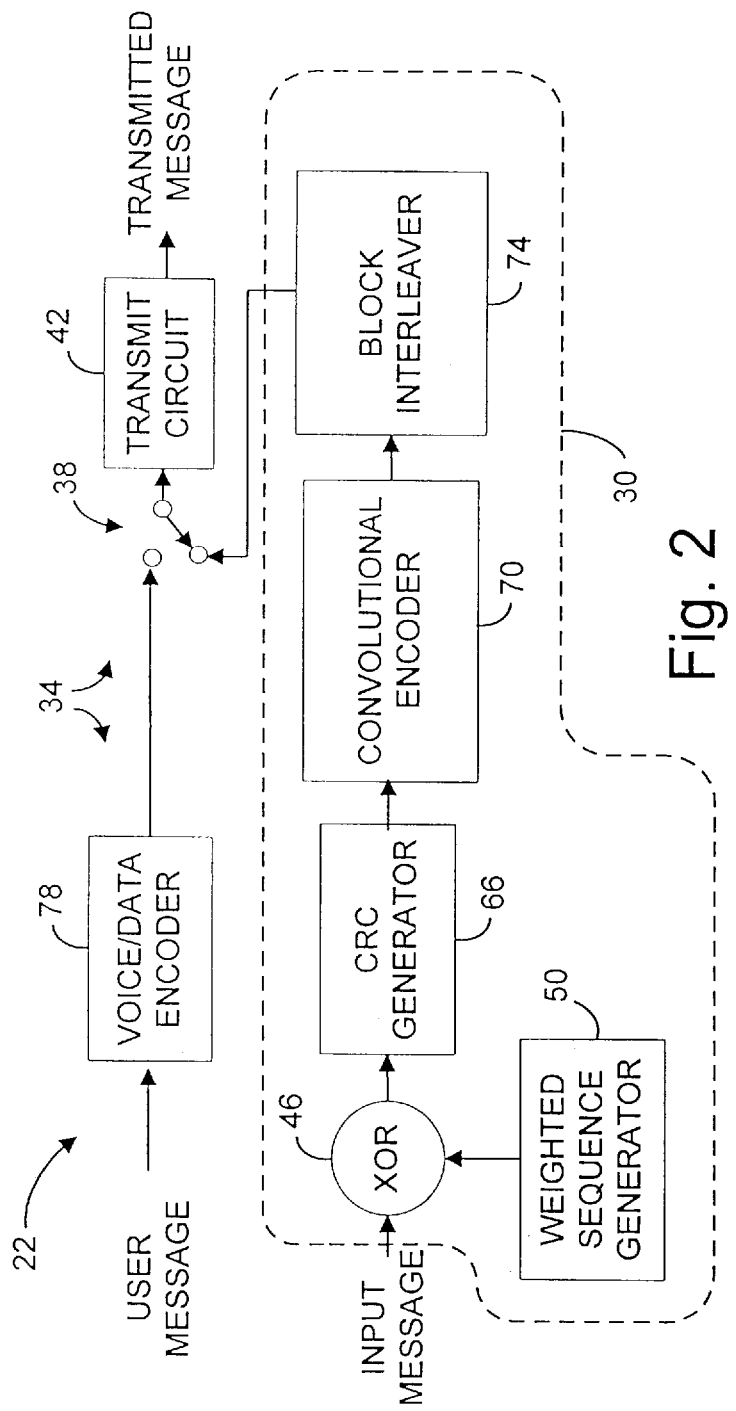
FIG. 2 is a block diagram of a transmitter according to the present invention.
Figure 4:
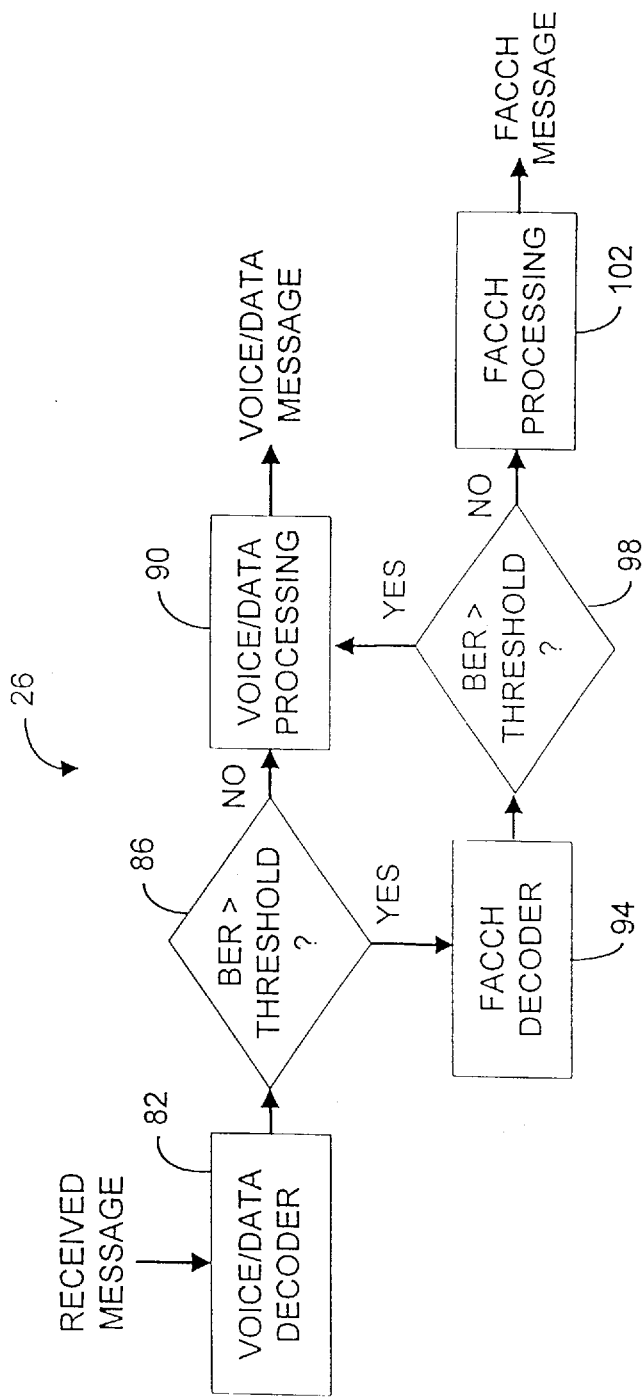
FIG. 4 is a block diagram of a receiver which decodes a message received from the transmitter shown in FIG. 2.

The base station 18 and radios 14 each include a transmitter 22, as shown in FIG. 2, and a receiver 26, as shown in FIG. 4. The transmitter 22 encodes control messages and user messages and transmits the encoded messages on the same RF channel to a remotely located receiver 26.

The transmitter 22 comprises two message encoding paths: a control message encoding path 30 for encoding a control message from control circuitry and a user message encoding path 34 for encoding a user message from a user interface (e.g. microphone, keypad, or external data interface). The encoding paths, 30 and 34, can be integrated within a microprocessor which executes preprogrammed instructions or can be defined within discrete circuitry.

Both of the encoding paths, 30 and 34, are connected to a switch 38 (e.g. logical decision within a microprocessor or a switching circuit) which selectively passes a message from only one of the paths, 30 and 34, at a time to a transmit circuit 42 for transmission to the remotely located receiver 26. Control messages are transmitted with a short time latency by the switch 38 operating to connect an encoded control message in path 30 to the transmit circuit 42 before any encoded user message in path 34. Control messages are encoded differently from user messages to identify to the receiver 26 whether the transmitted message contains user information or control information.

A control message in the encoding path 30 is modulated, such as by an exclusive-OR modulator 46, with a predetermined binary weighted sequence from a weighted sequence generator 50 to form a weighted control message. In this manner, control messages which have a low binary weight are increased when modulated with the binary weighted sequence. The binary weighted sequence is selected to have an average weighted value (i.e. average number of binary "1"s in a predetermined number of bits) which is as least as great as a predetermined weight value. As will be discussed in further detail below in connection with the receiver 26, the average weighted value of the binary weighted sequence is selected so that the weight of control messages is sufficiently increased by the modulator 46 to avoid misidentification of control messages as user messages by the receiver 26 (FIG. 4).

Generally, the CCITT V.52 standard binary sequence can be used as the binary weighted sequence since the V.52 binary sequence is weighted with about the same number of binary ones as zeros. The weighted sequence generator 50 generates the V.52 binary sequence using the following polynomial:

$$g(x)=X^9+X^5+1$$

Figure 3:
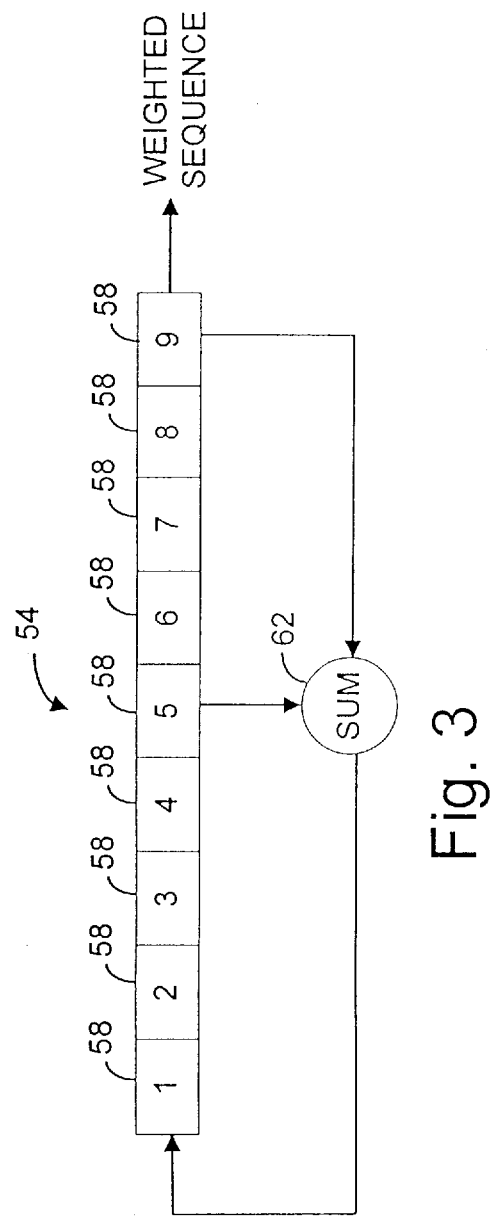
FIG. 3 is a block diagram of the weighted sequence generator which is shown in FIG. 2.

The V.52 polynomial is implemented as a shift register 54 having nine bit locations 58 as shown in FIG. 3. Initially, the bit locations 58 are all set to binary zero. In response to a clock signal, which has the same period as the bits in the control message, all bit locations 58 in the shift register 54 are shifted right with the binary value of the ninth bit location being output to form the binary weighted sequence from the weighted sequence generator 50 and the binary values of the fifth and ninth bit locations being added together by a binary summing circuit 62 and input to the first bit location.

The weighted control message output by the exclusive-OR modulator 46 is passed to forward error correction circuitry which includes a cyclic redundancy check (CRC) generator 66 and a convolutional encoder 70. The CRC generator 66 in combination with the convolutional coder 70 use forward error correction (FEC) codes to encode the weighted control message with additional information which enables the receiver 26 (FIG. 4) to correct erroneous binary values which may have been introduced into the message during transmission. The FEC codes are characterized by a predetermined level of coding protection, also commonly called the distance of the code, which is the maximum number of erroneous bits in a message, having a predetermined number of bits, that can be corrected by the receiver 26 (FIG. 4) using the additional information which was encoded into the message by the FEC codes. FEC codes are well known in the art and reference is made to a publication by Shu Lin and Daniel Costello entitled Error Control Coding: Fundamentals and Applications (1983), p330.

The CRC generator 66 adds parity bits to the weighted control messages from the exclusive-OR modulator 46 which enables the receiver 26 (FIG. 4) to identify the number of erroneous bits in a received message. The parity bits are generated using a CCITT CRC-16 standard code in which a weighted control message is divided by the polynomial:

$$g(x)=X^{16}+X^{12}+X^5+1$$

The quotient (remainder bits) of the division are used as 16 CRC parity bits which are added to the weighted control message. The CRC weighted message from the CRC generator 66 is encoded by the convolutional encoder 70 using a conventional forward error correction code, and in particular a rate-1/3 convolutional code which is conventionally described by the following code polynomials:

$$g0\ (x)=X^5+X^2+X+1$$
$$g1\ (x)=X^5+X^3+X+1$$
$$g2\ (x)=X^5+X^4+X^3+X^2+1$$

The encoded messages from the convolutional encoder 70 are interleaved by a block interleaver 74 in a conventional manner by writing a predetermined number of encoded messages along virtual columns in a memory (not shown) and then reading the encoded messages along virtual rows in the memory. The interleaved messages from the block interleaver 74 are selectively passed by the switch 38 to the RF transmission circuitry 42 for transmission to the receiver 26.

In contrast to control messages, user messages are encoded by a conventional voice/data encoder 78. In one embodiment, the voice/data encoder 78 includes APCO Project 25 industry standard CRC codes and convolutional codes which are described in detail in the publication entitled NLW Technology Standards Project 2nd Interim Report Digital Radio Technical Standards by the Telecommunications Industry Association (TIA), the contents of which are herein incorporated by reference in their entirety.

User messages are encoded differently from control messages by using a different convolutional rate in the voice/data encoder 78 in the user message encoder path 34 than in the convolutional coder 70 in the control message encoder path 30. Consequently, the convolutional rate of the transmitted message is indicative of whether the message is a control message or a user message.

With primary reference to FIG. 4, the receiver 26 distinguishes between control messages and user messages by determining how a received message was encoded. The receiver 26 initially assumes that a received message is a user message and attempts to decode the message with a voice/data decoder 82. After deinterleaving and decoding the message as a user message, the voice/data decoder 82 calculates the bit error rate (BER) for the message from the CRC bits in the message. A comparison circuit 86 compares the BER of the message to a predetermined threshold value. A high BER indicates that the received message is either a control message and was incorrectly decoded as a user message or that the received message contains a substantial number of erroneous or missing values. Conversely, a low BER indicates that the received message is a user message.

Consequently, the magnitude of the threshold value is selected so the BER of decoded user messages is generally less than or equal to the threshold value while the BER of control messages which have been decoded by the voice/data decoder 82 is greater than the threshold value. More particularly, the threshold value is selected so that a decoded message which has a BER which is sufficiently low to permit correction of the bit errors by the forward error correction codes in the voice/data decoder 82 is subsequently treated as a user message while a decoded message with a higher BER is further analyzed to determine whether the received message is likely a control message.

When the BER of the decoded message is less than or equal to the threshold value, the message is subsequently processed by a voice/data processing circuit 90 using conventional algorithms and methods to extract the user information for presentation to a user of the receiver 26.

When a control message has a relatively low binary weight, there is a risk that the FEC codes in the voice/data decoder 82 will erroneously change a sufficient number of binary ones in the control message to binary zeros so that the resulting decoded control message has a BER which is less than the selected threshold values of the comparison circuit 86. Such misidentification of the control message would result in the receiver 26 failing to extract and use the information in the control message and, consequently, result in degraded performance of the receiver 26.

To avoid such misidentification of the control message, the binary weighted sequence from the weighted sequence generator 50 is selected so that the average weighted value of the binary weighted sequence is at least as great as the level of coding protection which is provided by the FEC codes in the voice/data decoder 82. For example, when the FEC codes enable three erroneous bits in a 16 bit message to be corrected, the binary weighted sequence is selected so that there are at least 3 binary "ones" within every 16 bits of the binary weighted sequence (i.e. an average weighted value of at least 3). Modulation of the control message with the binary weighted sequence by the modulator 46 (FIG. 2) sufficiently increases the binary weight of the control messages so that the FEC codes in the voice/data decoder 82 cannot change a sufficient number of the binary ones in the control messages to zeros so as to cause the comparison circuit 86 to misidentify the control message as a user message.

When the BER of the decoded message is greater than the threshold value, the received message is further processed to determine whether it contains a control message or a user message with a substantial number of errors. The received message is decoded by a FACCH decoder 94 using the inverse of the rate-1/3 convolutional algorithm in the convolutional encoder 70 (FIG. 2). The FACCH decoder 94 calculates the BER of the decoded message from the CRC bits in the message.

Another comparison circuit 98 compares the BER to a predetermined threshold value, the magnitude of which is selected to be greater than the maximum BER which can be corrected by the forward error correction codes in the FACCH decoder 94. The received message is identified as a control message when the BER of the decoded message is no greater than the threshold value. Conversely, the received message is identified as a user message when the BER of the decoded message is greater than the threshold value.

In response to the message being identified as a control message, the decoded message is passed to FACCH processing circuitry 102 which extracts the control information for use by the radio 14 (FIG. 1) or base station 18 (FIG. 1) in which the receiver 26 resides. In contrast, when the received message is identified as a user message, it is passed to the voice/data processing circuitry 90 where it processed as a user message which contains a substantial number of erroneous or missing values. For example, the voice/data processing circuitry 90 can request the transmitter 22 to retransmit the previous message.

In summary, a process and apparatus is disclosed for encoding a control message for transmission by a transmitter to a receiver. A pattern of binary values is generated which has a predetermined average binary weight. The control message is modulated with the predetermined pattern of binary values. The modulated control message is encoded with a forward error correction code which provides a predetermined level of coding protection. Importantly, the average binary weight of the predetermined pattern of binary values is selected to be at least as great as the level of coding protection provided by the forward error correction code. In this manner, the binary weight of the control message is sufficiently increased to avoid misidentification of the control message as a user message by the receiver.

While the invention has been described in connection with what is presently considered to be the preferred embodiment, it is to be understood that the invention is not to be limited to the disclosed embodiment, but to the contrary, is intended to cover various modifications and equivalent arrangements included within the spirit and scope of the appended claims.

What is claimed is:

1. In a transmitter having a forward error correction code encoder with a predetermined level of coding protection, a method for encoding input signals for transmission by the transmitter, the method comprising the steps of:

generating a pattern of binary values having a predetermined average binary weight which is at least as great as the predetermined level of coding protection of the forward error correction code encoder;

modulating the input signals with the predetermined pattern of binary values; and encoding the modulated signals with information signals from the forward error correction code encoder which provides the predetermined level of coding protection.

2. The method of claim 1, wherein the input signals are indicative of binary values.

3. The method of claim 1, wherein the input signals are representative of information in a control message.

4. The method of claim 1, wherein the input signals are representative of information in a fast associated control channel message.

5. The method of claim 1, wherein the predetermined average binary weight of the pattern of binary values is substantially greater than the predetermined level of coding protection of the forward error correction code encoder.

6. The method of claim 1, wherein the pattern of binary values ($g(x)$) is generated according to the polynomial $g(x)=X^9+X^5+1$.

7. The method of claim 1, wherein the modulating step comprises the step of performing an exclusive-OR function on the input signals and the pattern of binary values to provide the modulated signals.

8. The method of claim 1, wherein the encoding step comprises the step of convolutionally encoding the modulated signals to provide convolutionally encoded signals.

9. An apparatus for encoding input signals for transmission by a transmitter, the apparatus comprising:

an input circuit which receives the input signals;

a binary value pattern generator which outputs a sequence of binary values having an average binary weight which is at least as great as a predetermined weight value;

a modulator which modulates the input signals with the sequence of binary values to output modulated signals; and a forward error correction encoder which receives the modulated signals and encodes the modulated signals with information signals which provide a predetermined level of coding protection substantially equal to the predetermined weight value.

10. The apparatus according to claim 9, wherein:

the input circuit receives input signals which are representative of information in a control message.

11. The apparatus according to claim 9, wherein:

the input circuit receives input signals which are representative of information in a fast associated control channel message.

12. The apparatus according to claim 9, wherein:

the average binary weight of the sequence of binary values from the binary value pattern generator is substantially greater than the predetermined weight value.

13. The apparatus according to claim 9, wherein:

the binary value pattern generator generates the sequence of binary values (g(x)) according to the polynomial $g(x)=X^9+X^5+1$.

14. The apparatus according to claim 9, wherein the modulator comprises:

an exclusive-OR circuit which is connected to receive the input signals from the input circuit and the sequence of binary values from the binary value pattern generator, the exclusive-OR circuit generating the modulated signals from an exclusive-OR function of the input signals and the sequence of binary values.

15. The apparatus according to claim 9, wherein:

the forward error correction encoder convolutionally encodes the modulated signals.

16. The apparatus according to claim 9, further comprising:

a microprocessor connected to the input circuit to receive the input signals, wherein each of the binary value pattern generator, the modulator, and the forward error correction encoder are programmed as predetermined instructions which are executed by the microprocessor.

* * * * *